June 20, 1933.  M. P. McLAUGHLIN  1,915,100
FLEXIBLE CONDUIT
Filed Jan. 20, 1933
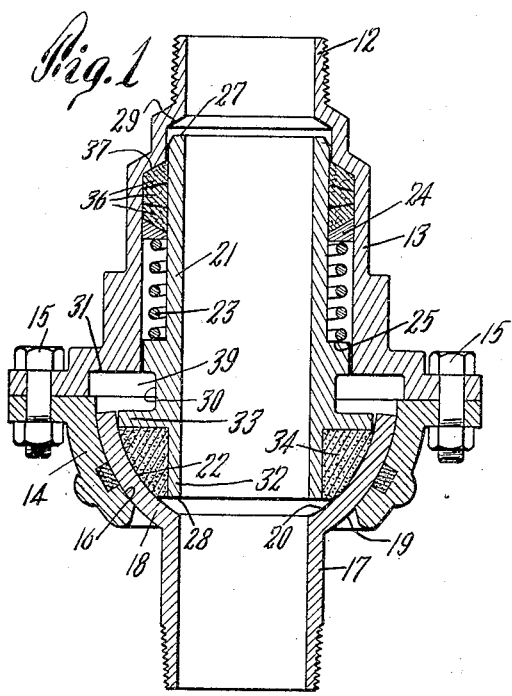
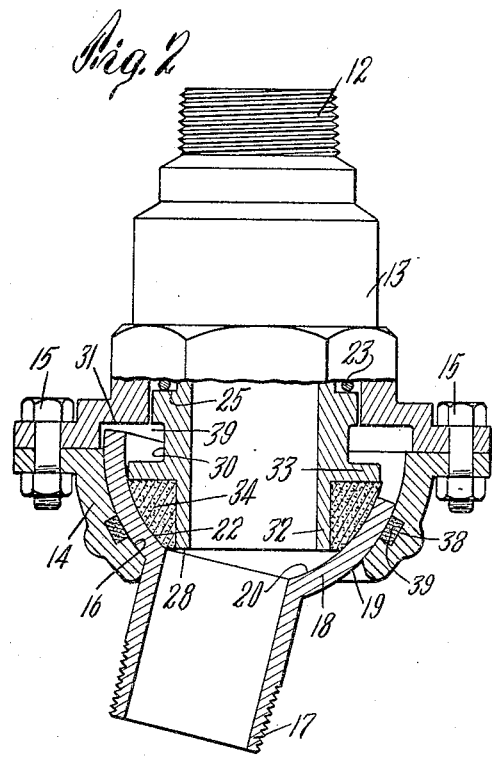
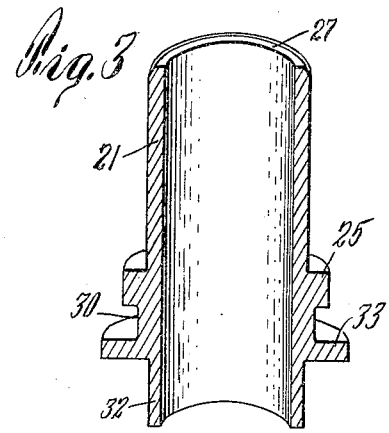
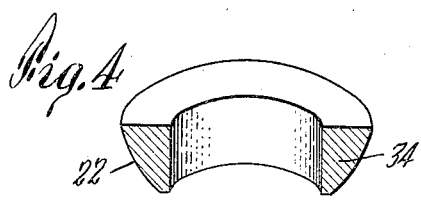
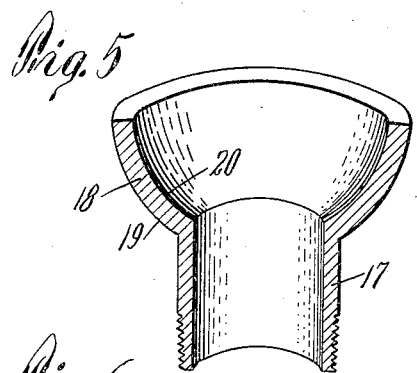
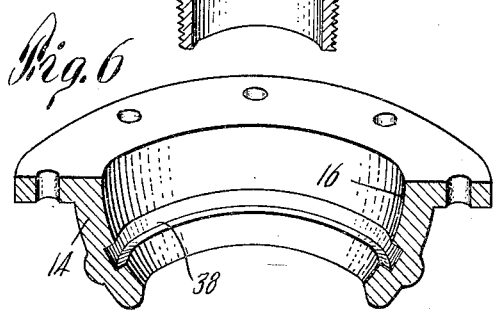
Inventor
Milton P. McLaughlin
by Wright Brown Quinby May
att'ys Patented June 20, 1933

1,915,100

UNITED STATES PATENT OFFICE

MILTON P. McLAUGHLIN, OF WAKEFIELD, MASSACHUSETTS

FLEXIBLE CONDUIT

Application filed January 20, 1933. Serial No. 652,683.

This invention relates to flexible conduits employed between railway train units to conduct steam, compressed air, or other fluid under pressure from one unit to another, such conduits being metallic and rendered flexible by metallic conducting ball and socket joint members.

The invention is embodied in a flexible conduit element adapted to constitute a portion of an elongated conduit extending between adjacent train units, said element including a casing having a inlet end adapted to be coupled to a fixed conduit member, a guiding body, and an annular base detachably secured to the body, and having a parti-spherical internal surface, an oscillatory outlet tube having an enlargement provided with a parti-spherical external surface movable on the internal surface of the casing base, and a parti-spherical internal face, an inner tube longitudinally movable to a limited extent in the body and guided thereby, the inner tube being provided with an enlargement having a parti-spherical external surface seated on the internal surface of the outlet tube enlargement, and permitting universal swinging movements of the outlet tube, and a spring maintaining the parti-spherical surfaces of the inner tube enlargement and the outlet tube enlargement in constant contact with each other.

One object of the invention is to provide effective means for balancing the movable inner tube by fluid pressure within the element, so that the fluid pressure is not biased or unbalanced, and the swinging of the delivering tube and flexure of the element is opposed only by the pressure of the parti-spherical surfaces of the inner and outer tube enlargements against each other by the spring. A conduit which includes a plurality of said elements arranged in tandem order, therefore has a very desirable degree of flexibility.

Another object is to provide the element with improved means for maintaining the said parti-spherical surfaces sufficiently lubricated during long periods of time, and without frequent renewal of the lubricant.

Another object is to provide an inner tube enlargement whose parti-spherical external surface is adapted to be maintained by wear thereof in close conformity to the internal surface of the outlet tube enlargement, thus maintaining a fluid-tight joint, and to enable said external surface to be conveniently renewed whenever renewal is required by wear.

Of the accompanying drawing forming a part of this specification,—

Figure 1 is a longitudinal section of a flexible conduit element embodying the invention, the element being straight.

Figure 2 is a view similar to a portion of Figure 1, the element being flexed.

Figures 3, 4, 5 and 6 are perspective sectional views showing respectively a portion of the inner tube, a portion of the renewable gasket constituting a portion of the inner tube enlargement, a portion of the oscillating outlet tube and its enlargement, and a portion of the casing base.

The same reference characters indicate the same parts in all of the figures.

The casing of my improved conduit element includes an inlet end 12 adapted to be coupled to a conduit member (not shown). Formed integral with the inlet end is a casing body 13 formed internally to guide the inner tube and to house the spring which exerts pressure on said tube.

The casing includes also an annular base 14, detachably secured to the body by bolts 15, and having a parti-spherical inner surface 16.

17 designates an oscillatory outlet tube adapted to be coupled to another conduit member (not shown), and having an enlargement 18 provided with a parti-spherical external surface 19, movable on the internal surface 16 of the base, and a parti-spherical internal surface 20 whose function will presently appear.

21 designates an inner tube longitudinally movable to a limited extent in the body 13, and guided by portions of the internal surface of said body as indicated by Figure 1. The inner tube is provided at one end with an enlargement having a parti-spherical external surface 22 seated on the internal surface 20 of the outlet tube enlargement.

23 designates a helical spring seated at one end on an outer abutment 24 in the body 13, and at the opposite end on an inner abutment 25 on the inner tube. The pressure of the spring exerted on the inner tube maintains the parti-spherical surface 22 on the inner tube enlargement in constant contact with the internal surface 20 of the outlet tube enlargement.

To cause a balanced pressure of fluid in the element on the inner tube and thus prevent a biased pressure causing objectionable resistance to the flexure of the element, I provide one end of the inner tube with an annular surface 27 facing in one direction and toward the inlet end 12, and the opposite end of said tube with an annular surface 28 facing in the opposite direction and toward the outlet tube 17, the areas of said surfaces being alike.

The body 13 is formed to expose the surface 27 to fluid pressure, said body having a shoulder portion 29 overhanging and spaced from the surface 27.

The internal surface 20 of the outlet tube enlargement is formed to expose the surface 28 to fluid pressure, the inner margin of the internal surface 20 diverging from and exposing all parts of the pressure-receiving surface 28 when the element is straight, as shown by Figure 1, and also exposing all parts of the surface 28 when the element is flexed, as shown by Figure 2. There is, therefore, no biased pressure on the inner tube tending to force it endwise, other than that caused by the spring 23. A conduit which includes a plurality of the described elements is therefore adapted to be easily flexed, flexure being opposed only by the spring pressure.

To enable the element to carry a long enduring supply of lubricant for the contacting faces of the inner tube and outlet tube enlargements, I provide the element with an annular lubricant chamber 39 surrounding the inner tube, and adapted to be charged with a mixture of grease and graphite when the body 13 and base 14 are separated, and hold the same in position to be applied to said contacting faces. Said chamber is preferably defined by a circumferential groove 30 in a thickened portion of the inner tube, an annular recess 31 formed in the body 13, and a portion of the base 14.

The arrangement is such that swinging movements of the outlet tube enlargement 18 cause portions of said enlargement to move into the chamber 39, and other portions to move out of the chamber, as indicated by Figure 2, the portions moving out of the chamber transferring lubricant to the contacting surfaces 20 and 22.

The enlargement of the inner end of the inner tube having the parti-spherical surface 22 is preferably formed as next described.

The inner tube has a cylindrical delivering end portion 32, and an annular flange 33 overhanging said portion. The inner tube enlargement is formed in part by the periphery of the flange 33, and in part by a renewable annular gasket 34 having a cylindrical internal face bearing removably on the end portion 32, an annular end face bearing removably on the flange 33, and a parti-spherical external face which is the face 22 already described, and bears on the internal face 20 of the outlet tube enlargement.

The gasket 34 is rigid, and composed of material adapted to be slowly worn away by rubbing contact with the internal face 20, and thus conformed closely by wear to said internal face which is of relatively hard and wear resisting material, such as brass, or other metal.

The gasket is preferably composed of a mixture of powdered graphite, powdered asbestos and powdered rubber molded under heavy pressure into a gasket formed as shown. A portion of the gasket preferably constitutes a portion of the pressure-receiving face 28, above described. The removability of the gasket enables it to be conveniently removed when worn, and replaced by another.

The casing body is provided with an internal annular shoulder constituting a packing seat 37. The outer spring abutment 24 is a ring movable toward and from the seat 37. Between the abutment 24 and seat 37 is interposed a packing preventing leakage of fluid between the casing and the inner tube, said packing being preferably composed of a plurality of compressible packing rings 36.

The parti-spherical internal surface 16 of the base is preferably provided with an annular groove 38, (Figure 6), to receive a lubricant.

I claim:

1. A flexible conduit element comprising a casing including an inlet end, a tube guiding body, and an annular base detachably secured to the body and having a parti-spherical internal surface; an oscillatory outlet tube having an enlargement provided with a parti-spherical external surface movable on the internal surface of the casing base and a parti-spherical internal surface; a longitudinally movable inner tube guided by said body, and provided at one end with an enlargement having a parti-spherical external surface seated on the internal surface of the outlet tube enlargement; and a spring seated on abutments in the body and on the inner tube, and maintaining the parti-spherical surfaces of the inner tube enlargement and the outlet tube enlargement in contact with each other, the inner tube having at its opposite ends annular pressure-receiving surfaces of like area, one facing in one direction and the other in the opposite direction, the body and the internal surface of the outlet tube being formed to expose said surfaces to fluid pressure within the element, the arrangement being such that the fluid pressure is balanced so that the swinging of the delivering tube is opposed only by the pressure exerted by the spring.

2. A flexible conduit element comprising a casing including an inlet end, a tube guiding body, and an annular base detachably secured to the body and having a parti-spherical internal surface; an oscillatory outlet tube having an enlargement provided with a parti-spherical external surface movable on the internal surface of the casing base and a parti-spherical internal surface; a longitudinally movable inner tube guided by said body and provided at one end with an enlargement having a parti-spherical external surface seated on the internal surface of the outlet tube enlargement; and a spring seated on abutments in the body and on the inner tube, and maintaining the parti-spherical surfaces of the inner tube enlargement and the outlet tube enlargement in contact with each other, the inner tube having a cylindrical delivering end portion and an annular flange overhanging said portion, the inner tube enlargement being formed in part by said flange, and in part by a renewable annular gasket having a cylindrical internal face bearing removably on said delivering end portion, an annular end face bearing removably on said flange, and a semi-spherical external face bearing on the inner face of the outlet tube enlargement, the gasket being rigid and composed of material adapted to be conformed closely by wear to the internal surface of the outlet tube enlargement, and form a fluid tight joint therewith.

3. A flexible conduit element comprising a casing including an inlet end, a tube guiding body, and an annular base detachably secured to the body and having a parti-spherical internal surface; an oscillatory outlet tube having an enlargement provided with a parti-spherical external surface movable on the internal surface of the casing base and a parti-spherical internal surface; a longitudinally movable inner tube guided by said body, and provided at one end with an enlargement having a parti-spherical external surface seated on the internal surface of the outlet tube enlargement, said casing being provided with an annular internal packing seat, the inner tube being provided with an inner spring abutment spaced from said seat, a spring seated on said inner abutment and on a movable annular outer abutment, and an annular packing interposed between the packing seat and the outer abutment, the spring maintaining the parti-spherical surfaces of the inner tube enlargement and the outlet tube enlargement in contact with each other.

4. A flexible conduit element comprising a casing including an inlet end, a tube guiding body, and an annular base detachably secured to the body and having a parti-spherical internal surface; an oscillatory outlet tube having an enlargement provided with a parti-spherical external surface movable on the internal surface of the casing base and a parti-spherical internal surface; a longitudinally movable inner tube guided by said body, and provided at one end with an enlargement having a parti-spherical external surface seated on the internal surface of the outlet tube enlargement, said casing being provided with an annular internal packing seat, the inner tube being provided with an inner spring abutment spaced from said seat, a spring seated on said inner abutment and on a movable annular outer abutment, and an annular packing interposed between the packing seat and the outer abutment, the spring maintaining the parti-spherical surfaces of the inner tube enlargement and the outlet tube enlargement in contact with each other, the parti-spherical internal surface of the base being provided with a lubricant-receiving groove.

In testimony whereof I have affixed my signature.

MILTON P. McLAUGHLIN.